Aug. 25, 1964   O. BOLTON, JR., ETAL   3,145,684
LOCKING CLEAT
Filed Feb. 27, 1962
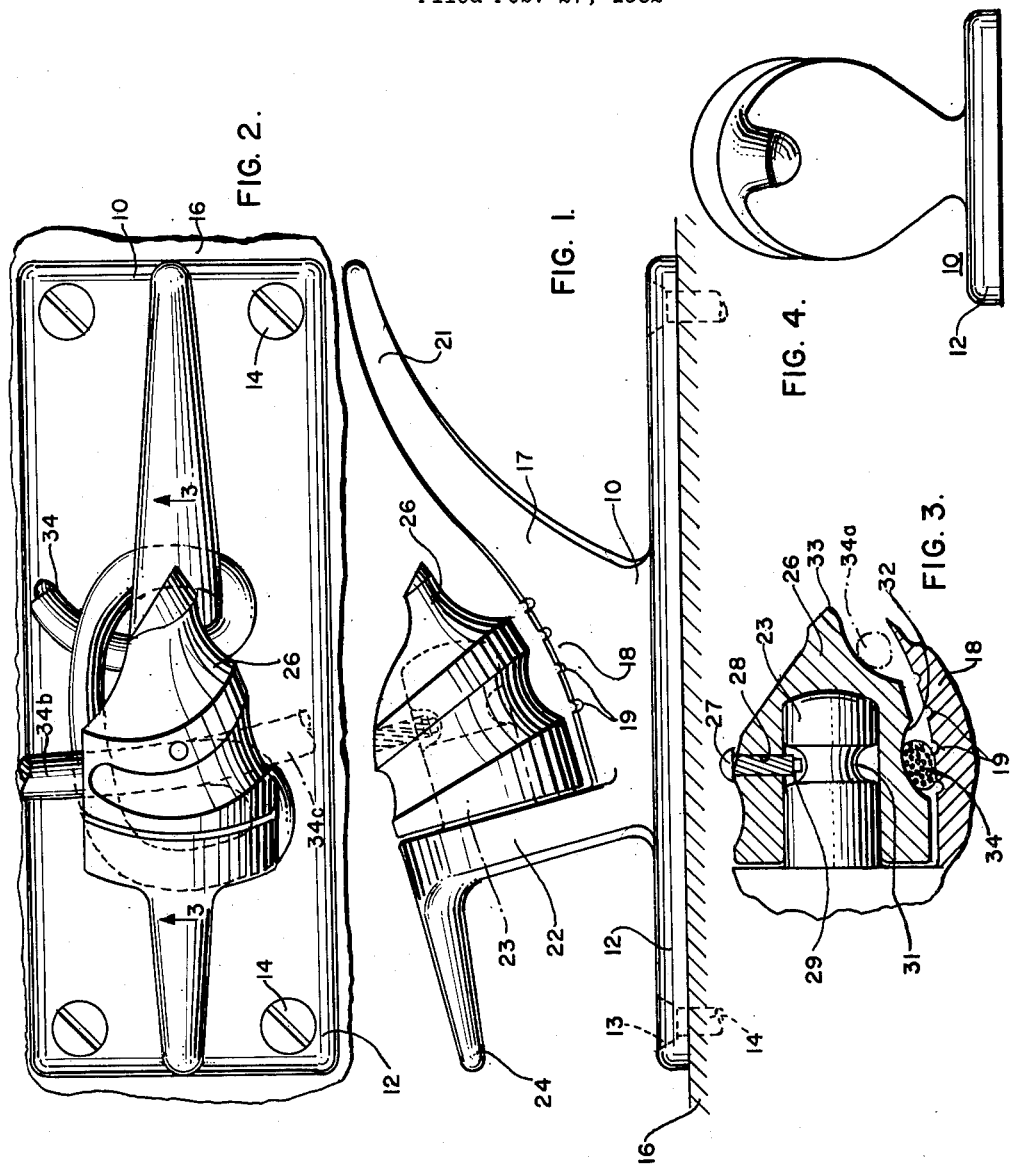
INVENTOR.
ORA BOLTON, JR
AND
CHARLES WADE
By Pearce & Schaeperklaus
Attorneys.

United States Patent Office 3,145,684
Patented Aug. 25, 1964

3,145,684
LOCKING CLEAT
Ora Bolton, Jr., Box 600, River Road, Cold Spring, Campbell City, Ky., and Charles Wade, 5422 Eastwood Drive, Cincinnati 27, Ohio
Filed Feb. 27, 1962, Ser. No. 176,076
6 Claims. (Cl. 114—218)

This invention relates to a cleat construction.

An object of this invention is to provide a cleat for holding a line attached to a boat or the like, which holds the line firmly when there is a pull or load on the line and which can readily be released by pulling on the free end or fall of the line.

A further object of this invention is to provide a cleat of this type in which a line gripping pulley or rotating cam is rotatably mounted on a main portion or body of the cleat and in which the pulley is of generally conic shape and has a helically arranged cam slot which can grip a portion of the line against the main portion of the cleat to hold the line which may be of any size within a substantial range of size.

A further object of this invention is to provide a cleat of this type which includes a horn to which a free end of the line can be attached to prevent inadvertent release of the line from the pulley.

The above and other objects and features of the invention will be apparent to those skilled in the art to which this invention pertains from the following detailed description and, the drawing, in which:

FIG. 1 is a view in side elevation showing a cleat constructed in accordance with an embodiment of this invention, the cleat being shown in association with a floor of a dock, the floor being shown in section;

FIG. 2 is a plan view of the cleat illustrated in FIG. 1, a line being shown attached thereto in full lines, the line being shown in partly attached condition in dot-dash lines;

FIG. 3 is a view in section taken on a line 3—3 in FIG. 2; and

FIG. 4 is a view in end elevation of the cleat removed from the dock.

In the following detailed description and the drawing, like reference characters indicate like parts.

In FIGS. 1 and 2 is shown a cleat 10 constructed in accordance with an embodiment of this invention. The cleat includes a base plate 12 having openings 13 (FIG. 1) adjacent the corners thereof which receive screw fasteners 14 or the like which attach the cleat to a floor 16 of a dock, a portion of a boat or the like. A main body portion 17 (FIG. 1) integral with the base plate 12 extends upwardly therefrom. The main body portion 17 includes a central line gripping section 18 provided with transverse grooves 19, a main horn 21, a journal supporting plate 22, a journal 23 mounted thereon, and a prong 24. A pulley or rotating cam 26 is rotatably mounted on the journal 23. A self threading metal screw 27 received in a bore 28 (FIG. 3) in the pulley 26 has an inner end portion 29 (FIG. 3) received in a groove 31 in the journal to hold the pulley in assembled relation on the journal.

The outer face of the pulley 26 is generally conic in shape and is formed with a spiral groove 32 which extends from adjacent the tip 33 of the pulley where the groove is closely spaced from the axis and substantially spaced from the line gripping section 18 of the body portion 17, progressively to the base of the pulley when the groove is spaced further from the axis of the pulley and is adjacent the line gripping section 18 adapted to grip a portion of a rope or line 34 against the body portion.

When the line 34 is to be attached to the cleat, the line can be brought into the space between the tip 33 and the line gripping section 18 of the body portion 17, as indicated in dot-dash lines at 34a in FIG. 3. When there is a load on a fall 34b (FIG. 2) of a line, the line causes the pulley to turn in a direction such that the line is engaged in the groove 32 and is advanced along the pulley to the position shown in full lines at 34 in FIG. 3 at which the line is gripped by the cleat. However, the line can readily be released by pulling on a fall 34c (FIG. 2) of the line (shown in dot-dash lines). When the line is intended to remain attached to the cleat for a substantial period, the line can be wound around the main body portion under the prong 24, and a half hitch can be taken around the horn 21 as shown in full lines in FIG. 2 to attach the line in a more permanent fashion.

The cleat construction illustrated in the drawing and described above is subject to structural modification without departing from the spirit and scope of the appended claims.

Having described our invention, what we claim is new and desire to secure by Letters Patent is:

1. A cleat which comprises a body, a pulley having a conic face rotatably mounted on the body, the pulley having a small end, the small end being exposed, the body having a line-gripping portion adjacent the conic face of the pulley, the base of the conic face being closely spaced from the line-gripping portion of the body, the small end of the conic face being further spaced therefrom, there being a spiral groove in the conic face, the line-gripping portion and the conic face being adapted to grip a line received in the spiral groove.

2. A cleat which comprises a body, a pulley having a conic face rotatably mounted on the body, the pulley having a small end, the small end being exposed, the body having a line-gripping portion adjacent the conic face of the pulley, the base of the conic face being closely spaced from the line-gripping portion of the body, the small end of the conic face being further spaced therefrom, there being a spiral groove in the conic face, the line-gripping portion and the conic face being adapted to grip a line received in the spiral groove, and a horn integrally formed with the body portion for receiving a free fall of the line.

3. A cleat which comprises a body, a pulley having a conic face rotatably mounted on the body, the pulley having a small end, the small end being exposed, the body having a line-gripping portion adjacent the conic face of the pulley, the base of the conic face being closely spaced from the line-gripping portion of the body, the small end of the conic face being further spaced therefrom, the line-gripping portion and the conic face being adapted to grip a rope received therebetween.

4. A cleat comprising a body having a line-gripping portion, a securing member rotatably mounted on the body in close spaced relation to said line-gripping portion, said securing member having an exposed end, said securing member having a line receiving groove which extends in outwardly spiraling helical manner from the exposed end of the securing member to the end thereof adjacent the body, whereby a portion of a line received in said groove may be secured by gripping the line between said member and said line-gripping portion of the body.

5. A cleat comprising a body having a line-gripping portion, an integral arm in spaced relation thereto, a hollow securing member rotatably mounted on said arm and secured against movement axially thereof, said arm supporting said securing member in close spaced relation to said line-gripping portion with one end of the securing member exposed, said securing member having a line receiving groove which extends in outwardly spiraling helical manner from the exposed end of the securing member toward the end thereof adjacent the body, whereby a portion of a line may be received in said groove and secured by gripping between said member and said line-gripping portion of the body.

6. A cleat comprising a body having a line-gripping portion and an annularly grooved integral arm in spaced relation to said line-gripping portion, a hollow securing member rotatably mounted on said arm and secured against movement axially thereof by a member in fixed relation to said securing member and extending into said annular groove, said arm supporting said securing member in close spaced relation to said line-gripping portion with one end of the securing member exposed, said securing member having a line receiving groove which extends in outwardly spiraling helical manner from the exposed end of the securing member toward the end thereof adjacent the body, whereby a portion of a line may be received in said groove and secured by gripping between said member and said line gripping portion of the body.

References Cited in the file of this patent

UNITED STATES PATENTS

| | | |
|---|---|---|
| 791,485 | Morrell | June 6, 1905 |
| 1,767,568 | Wills | June 24, 1930 |
| 2,387,599 | Miller | Oct. 23, 1945 |
| 2,435,447 | Kortum | Feb. 3, 1948 |
| 2,447,080 | Meier | Aug. 17, 1948 |
| 2,767,003 | Gilmont | Oct. 16, 1956 |

UNITED STATES PATENT OFFICE
CERTIFICATE OF CORRECTION

Patent No. 3,145,684                          August 25, 1964

Ora Bolton, Jr., et al.

It is hereby certified that error appears in the above numbered patent requiring correction and that the said Letters Patent should read as corrected below.

In the grant, line 1, for "Campbell City, Kentucky" read -- Cold Spring, Kentucky --; in the heading to the printed specification, lines 3 and 4, for "Box 600, River Road, Cold Spring, Campbell City, Ky.," read -- Box 600, River Road, Cold Spring, Ky., --.

Signed and sealed this 19th day of January 1965.

(SEAL)
Attest:

ERNEST W. SWIDER                          EDWARD J. BRENNER
Attesting Officer                            Commissioner of Patents